United States Patent [19]
Yamada et al.

[11] Patent Number: 5,494,009
[45] Date of Patent: Feb. 27, 1996

[54] VALVE CONTROL DEVICE FOR INTERNAL COMBUSTION ENGINE

[75] Inventors: Yosihiko Yamada; Seinosuke Hara, both of Atsugi, Japan

[73] Assignee: Unisia Jecs Corporation, Atsugi, Japan

[21] Appl. No.: 312,902

[22] Filed: Sep. 30, 1994

Related U.S. Application Data

[63] Continuation of Ser. No. 196,858, Feb. 15, 1994, abandoned.

[30] Foreign Application Priority Data

Feb. 15, 1993 [JP] Japan ................ 5-004289 U
Feb. 23, 1993 [JP] Japan ................ 5-006177 U
Feb. 26, 1993 [JP] Japan ................ 5-038276

[51] Int. Cl.$^6$ .................................................... F01L 1/34
[52] U.S. Cl. .................................... 123/90.17; 123/90.31
[58] Field of Search .......................... 123/90.15, 90.17, 123/90.31, 90.33, 90.34, 90.6; 74/567, 568 R

[56] References Cited

U.S. PATENT DOCUMENTS

| | | | |
|---|---|---|---|
| 3,633,555 | 1/1972 | Raggi | 123/90.17 |
| 4,754,729 | 7/1988 | Abe et al. | 123/90.34 |
| 4,942,854 | 7/1990 | Shirai et al. | 123/90.6 |
| 4,957,079 | 9/1990 | Nakatani et al. | 123/90.34 |
| 5,080,053 | 1/1992 | Parsons | 123/90.17 |
| 5,161,493 | 11/1992 | Ma | 123/90.17 |
| 5,186,129 | 2/1993 | Magnan et al. | 123/90.34 |
| 5,199,393 | 4/1993 | Baldassini | 123/90.17 |
| 5,309,872 | 5/1994 | Filippi et al. | 123/90.6 |
| 5,333,579 | 8/1994 | Hara et al. | 123/90.17 |
| 5,365,896 | 11/1994 | Hara et al. | 123/90.17 |

FOREIGN PATENT DOCUMENTS

| | | |
|---|---|---|
| 0353988 | 2/1990 | European Pat. Off. . |
| 4116942 | 5/1992 | Germany . |
| 57-198306 | 12/1982 | Japan . |
| 2165885 | 4/1986 | United Kingdom . |
| 2166842 | 5/1986 | United Kingdom . |
| 2268246 | 1/1994 | United Kingdom . |

OTHER PUBLICATIONS

V. Kuentscher, *Kraftfahrzeugmotoren—Auslegung und Konstruktion*, VEB—Verlag Technik, Berlin, 1987, pp. 423–425.

*Primary Examiner*—Weilun Lo
*Attorney, Agent, or Firm*—Foley & Lardner

[57] ABSTRACT

An improved control device for intake and/or exhaust valves of an internal combustion engine includes a small circumference portion defined in a drive shaft at a location corresponding to that of an annular member which is eccentrically displaced for changing a rotational phase of the cams. According to this a degree of displacement of the annular member may be increased and control the cams, and thereby the engine valves, may be enhanced. Further, the cam lobe of each cam is formed such that side portions thereof are asymmetrical with respect to a center line of the cam for favorably affecting valve opening and closing timings. In addition, an improved lubricating arrangement for enhancing smooth operation and improved engine performance.

25 Claims, 14 Drawing Sheets

VALVE CONTROL DEVICE FOR INTERNAL COMBUSTION ENGINE

This application is a continuation of application Ser. No. 08/196,858, fled Feb. 15, 1994, now abandoned.

BACKGROUND OF THE INVENTION

1. Field of the Invention

The present invention relates generally to a control device for an internal combustion engine. Specifically, the present invention relates to a control device for controlling intake and exhaust valves of an internal combustion engine.

2. Description of the Related Art

The present disclosure relates to improvements in a device for controlling opening and closing of intake and exhaust valves of an internal combustion engine as set forth in co-pending related U.S. patent applications Ser. Nos. 08/077,509, 08/077,510 now U.S. Pat. No. 5,365,896, and 08/008,801, now U.S. Pat. No. 5,333,579 filed by the present applicant.

For explaining the task of the present invention, one type of conventional device for controlling intake and exhaust valves of an engine will be described hereinbelow with reference to FIGS. 8 and 9.

Japanese Utility Model 57-198306 discloses a cam 2 which is rotatably disposed about a cam shaft 1. The cam 2 functions to open an intake valve 16 against a biasing force of a valve spring 17 (FIG. 8) with the aid of a rocker arm 15. As may be seen in FIG. 9, the cam 2 is positioned axially along the cam shaft 1 between a cam shaft receiving bracket 3 and a flange member 5 which is secured to the cam shaft 1 by means of a key 4.

The cam 2 has at one end thereof a flange portion 7 which is formed with a generally U-shaped recess 6. The above-mentioned flange member 5 is also formed with a generally U-shaped recess 8.

Between the flange member 5 and the flange portion 7, there is disposed an annular member 9. The annular member 9 has disposed at diametrically opposed portions thereof pins 10 and 11 which slidably engage the U-shaped recesses 6 and 8. The annular member 9 has a cylindrical outer surface rotatably supported by a control ring 12. As is seen from FIG. 8, the control ring 12 has, at an outer peripheral portion thereof, a projection 12a which is rotatably held in a supporting bore 13 formed in a cylinder head. The control ring 12 has, at a portion diametrically opposed to the projection 12a, an arcuate toothed portion 12b which engages a toothed ring 14a provided around a rocker shaft 14.

The control ring 12 is urged to pivot back and forth in the supporting bore 13 by a drive mechanism (not shown) via the toothed ring 14a and the toothed portion 12b. As seen in FIG. 9, an inner annular surface 9a of the annular member 9 faces an outer annular surface 5a of the flange member 5 with a space 18 defined therearound for allowing eccentric movement of the annular member 9 relative to the camshaft 1.

For example, during low speed shifting of the engine, a fluid pressure actuator (not shown) the driving mechanism (not shown) is active to move the rocker shaft 14 in a first direction thus the toothed portion 14a of the rocker shaft is moved such that the control ring is pivoted at the projection 12a thereof causing the annular member to be moved eccentrically to the axis 'C' of the camshaft. Similarly, during high speed shifting of the engine the fluid pressure actuator (not shown) urges the rocker shaft 14 in the opposite direction so as to move the annular member 9 via the control ring 12 in the opposite direction so as to be disposed eccentric to the axis C, angularly displaced therefrom in the opposite direction from the eccentric displacement effected during downshifting.

That is, when the center 'C' of the annular member 9 assumes the position as shown in FIG. 8, the cam shaft 1 and the annular member 9 are coaxially aligned. Thus, under this condition, the annular member 9 rotates synchronously with the cam shaft 1 due to engagement between the pin 11 and the U-shaped recess 8, and the cam 2 rotates synchronously with the cam shaft 1 due to engagement between the pin 10 and the U-shaped recess 6.

When in response to engine operation, the rocker shaft 14 supporting the rocker arm 15 is rotated by the drive mechanism (not shown), the control ring 12 is pivoted in a given direction using the projection 12a as a fulcrum. With this, the center 'C' of the annular member 9 becomes eccentric to the cam shaft 1. Accordingly, the pins 10 and 11 are slid in and along the respective U-shaped recesses 6 and 8, and the flange member 5 and the flange portion 7 are pivoted around the cam shaft 1. Thus, each time the cam shaft 1 makes one turn, the rotation phase of the annular member 9 relative the cam shaft 1 is changed and, at the same time, the rotational phase of the cam 2 relative the annular member 9 is also changed. Accordingly, the cam 2 rotates relative to the cam shaft 1 with a phase difference determined according to the eccentric displacement of the annular member 9 relative to the cam shaft 1. Thus, the valve timing can be varied in accordance with the phase difference of the cam 2.

According to this, at low speed ranges, the valve opening timing of the intake valve is slowed while the valve closing timing is advanced such that an interval during which opening of the intake valve overlaps opening of an exhaust valve becomes short for promoting combustion and low speed torque. On the other hand, at high speed ranges, the eccentric movement of the annular member 9 controls the valve timing such that an opening timing of the intake valve is advanced and a closing timing thereof is slowed and a time at which the opening of the intake and exhaust valves overlap becomes long, for obtaining high power output.

According to this, when the annular member 9 is moved eccentrically to the cam shaft 1 a width L1 of the space between the outer annular surface 5a of the flange portion 5 and the inner annular surface 9a of the annular member 9 becomes small at one side of the flange member 5 and a degree of eccentric movement of the annular member becomes limited according to a thickness of the flange member. Thus a large degree of eccentric displacement of the annular member is not possible according to the conventional structure.

Accordingly a large rotational phase difference between the annular member 9 and the cam shaft 1 is not possible and thus large variation in angular velocity may not be imparted to the cam 2 and a range of valve timing control is limited to a substantially small range. This problem may be alleviated by by reducing a circumference of an outer annular surface 5a of the flange portion 5 or alternatively by enlarging and inner annular surface 9a of the annular member 9, for example.

Thus it has been required to provided a control arrangement for moving an automotive cam 2 relative a cam shaft 1 thereof which allows substantially large variation of rotational phase of the cam 2 relative the cam shaft 1.

Also, according to the above arrangement, since movement off the annular member 9 controls the rotational phase of a single cam 2, in high performance engines, for example, where a large number of valves are present, such as engines which may have a pair of intake valves and a pair of exhaust valves for every cylinder, providing such a control arrangement as described above requires a substantially large space and large number of parts, and of course, larger costs.

SUMMARY OF THE INVENTION

It is therefore a principal object of the present invention to overcome the drawbacks of the related art.

It is a further object of the present invention to provide a control arrangement for moving an automotive cam relative a cam shaft thereof which allows substantially large variation of rotational phase of the cam relative the cam shaft.

In order to accomplish the aforementioned and other objects, in an internal combustion engine having a drive shaft, and a plurality of cams formed about a cam shaft for operating intake and exhaust valves, a control device is provided, comprising: a first flange provided on the cam shaft, the first flange having a first elongate slit which extends radially, a second flange facing the first flange with a certain clearance therebetween and being secured to the drive shaft to rotate therewith, the second flange having a second elongate slit which extends radially, an annular member rotatably disposed within the clearance the drive shaft being disposed through a central opening of the annular member with a given clearance therebetween, first and second pins disposed on opposed sides of the annular member respectively, the first and second pins being provided on opposing sides of the annular member and disposed at diametrically opposed positions with respect to a center of the annular member and slidably engaged with the first and second elongate slits respectively, drive means for pivoting the annular member about a pivot axis eccentric to the axis of the drive shaft in accordance with an operating condition of the engine, lubricating means providing lubricating fluid to in the vicinity of the engagement between the first and second pins and the first and second elongate slits, wherein the drive shaft has a reduced circumference portion formed therein at a position at which the drive shaft passes through the central opening of the annular member, and wherein a profile of a cam provided on the cam shaft is formed such that lift and closing sides of the cam are asymmetrical with respect to center line thereof.

DESCRIPTION OF THE PREFERRED EMBODIMENT

Figure 1:
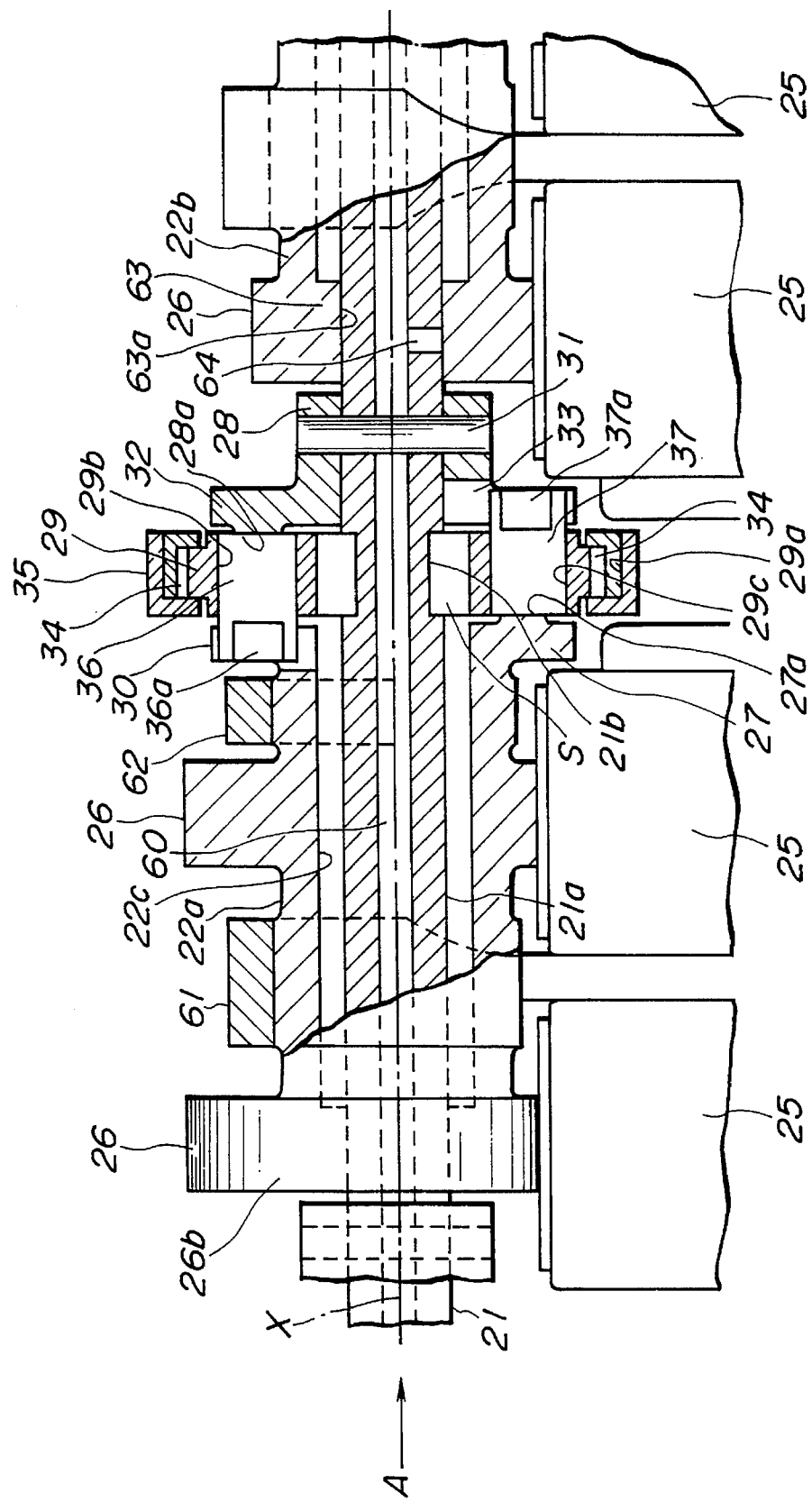
FIG. 1 is a cross-sectional view of a preferred embodiment of a valve control device according to the invention.
Figure 2:
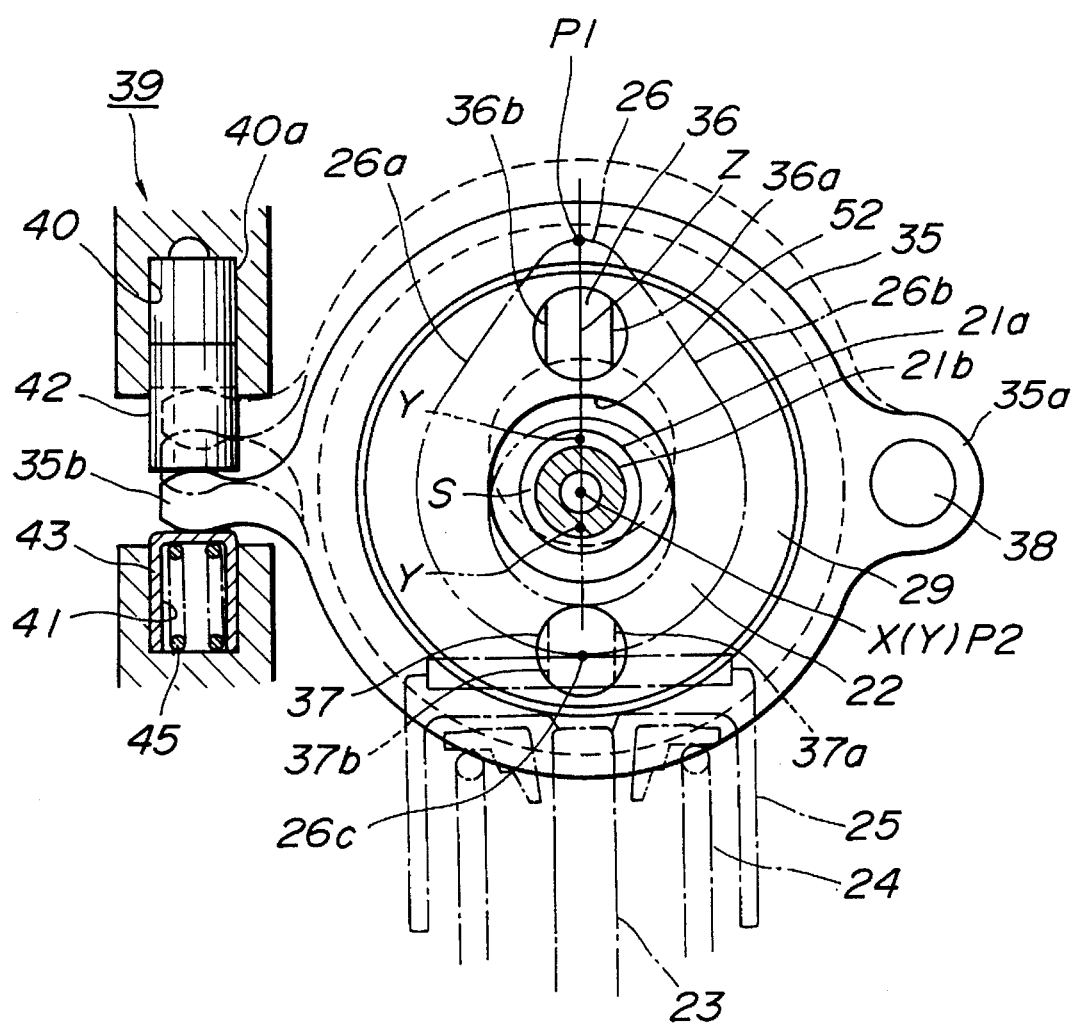
FIG. 2 is a view of a control ring arrangement of the valve control device of FIG. 1.
Figure 3:
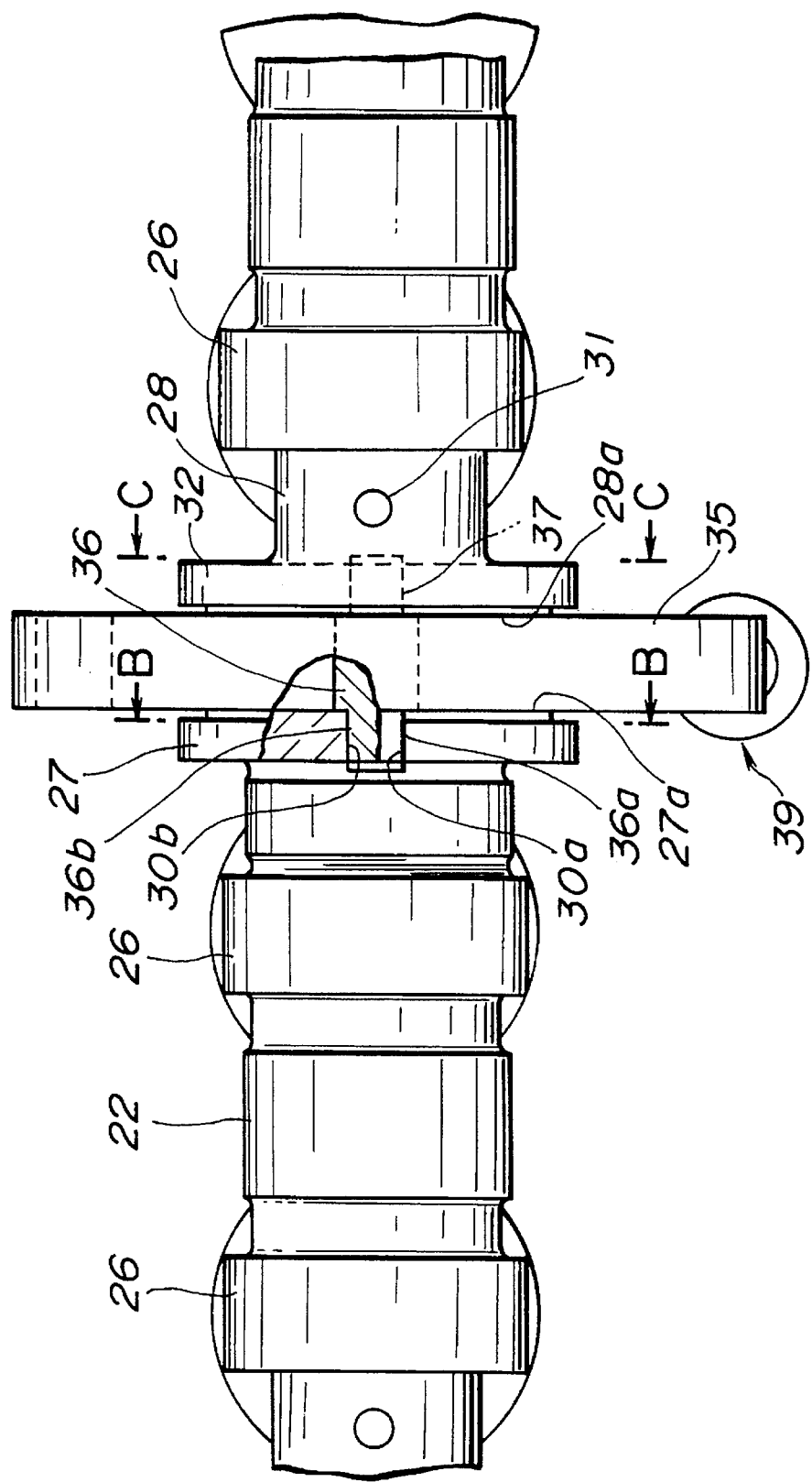
FIG. 3 is a plan view of a cam shaft arrangement according to the preferred embodiment.

Referring now to the drawings, particularly to FIGS. 1–3, a valve control device for an internal combustion engine according to a preferred embodiment of the invention will be described hereinbelow in detail.

FIG. 1 shows a drive shaft 21 to which torque is applied from an engine crankshaft (not shown). A camshaft 22 is disposed around the drive shaft 21 with a certain annular clearance therebetween. These shafts 21 and 22 are arranged coaxially around an axis 'X'. The drive shaft 21 may be provided with a lubrication passage 60 therethrough which is in fluid communication with a main oil gallery (not shown) of the engine. The drive shaft 21 is disposed in the longitudinal direction of the engine.

The camshaft 22 is also hollow and is rotatably held by support portions 61, 62 supporting the first cam shaft section 22a, the supports 61, 62 may be provided on an engine cylinder head (not shown). Also a support 63 formed on the second cam shaft section 22b rotatably supports a front portion of the drive shaft 21. As may be understood from FIG. 3, a plurality of cams 26 may be integrally formed at regularly spaced intervals on the cam shaft 22. Each cam 26 functions to open an intake valve 23 via a valve lifter 25 against the biasing force of a valve spring 24.

Figure 9:
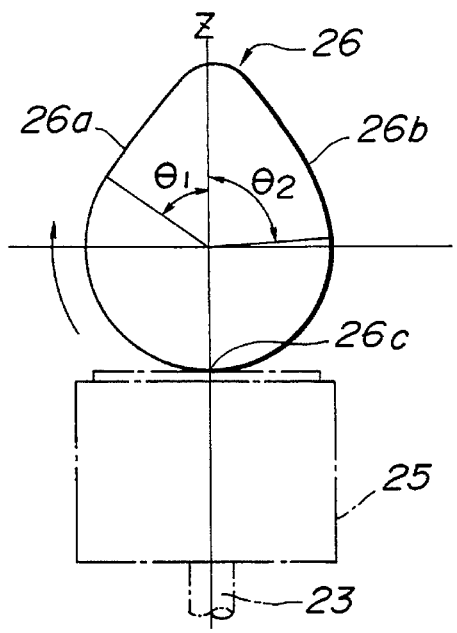
FIG. 9 is a plan view of an asymmetrical cam according to the invention.

Referring to FIG. 9 it will be noted that, according to one modification according to the invention, the cam profile of the side portions 26a and 26b defining a cam lobe of the cam 26 may be made asymmetric with respect to an center line of the cam 26 as will be described in detail hereinlater.

As may be seen in FIG. 1, the cam shaft 22 is divided into two shaft sections 22a and 22b which are axially spaced from one another. The first shaft section 22a (to the left of FIG. 1) has a flange portion 27 formed at a first end thereof which faces the second shaft section 22b. Between the two flange sections 22a and 22b a sleeve 28 with an annular member 29 formed therearound are arranged.

The first cam shaft section 22a has an insert opening 22c in which the drive shaft 21 is rotatably received. While the inner surface 63a of the support 63 rubbingly contacts the drive shaft. As may be seen in FIG. 1, an oil passage 64 is formed in the drive shaft at a location corresponding to the support 63 of the second shaft section 22b of the cam shaft 22 for lubricating the point of rubbing contact between the two members. According to this arrangement, a clearance between the support 63 and the drive shaft is not necessary and a size and length of the control device may be reduced.

Forming the support 63 at the end of the second shaft section 22b of the cam shaft 22 allows centering of the cam shaft and the drive shaft to be effected easily. The support surface 63a may be easily tooled for adjustment.

Also according to provision of the oil passage 64, fluidly communicated with the oil passage 60 of the drive shaft 21 allows constant lubrication of the point of contact between the camshaft 22 and the drive shaft 21, thus assuring low friction and smooth rotation therebetween. And, since the insert opening 22c needs only to be formed in the first shaft section of the cam shaft 22, manufacturing is simplified.

Figure 4:
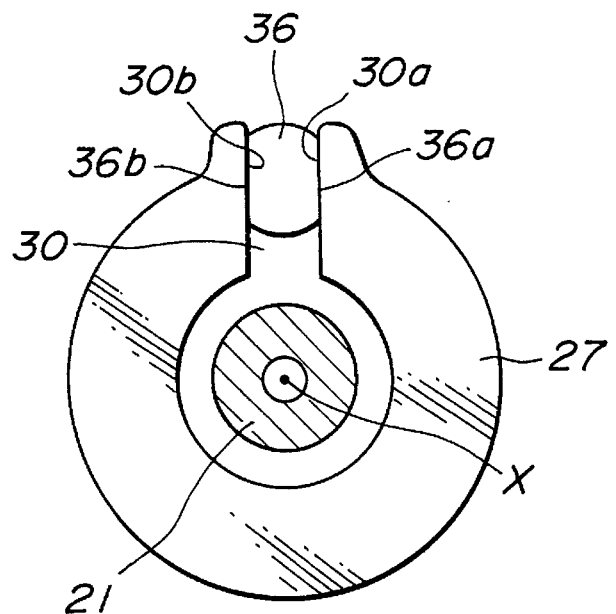
FIG. 4 is a view of engagement between the cam shaft and the annular member taken along line B—B of FIG. 3.

As may be understood from FIGS. 3 and 4, the flange portion 27 of the first shaft section 22a is formed with an elongate slit 30 which extends radially outward from the hollow center portion thereof. The slit 30 is of uniform width therealong. As seen in FIG. 3, the flange portion 27 is integrally formed with a projected annular surface 27a which contacts one side surface of the annular member 29.

Referring again to FIG. 1, it may be seen that the sleeve 28 is fixed to the drive shaft 21 by means of a connecting pin 31 which passes through the sleeve 28 and the drive shaft 21. At a side of the sleeve 28 adjacent the annular member 29, a flange portion 32 which extends radially outward. The slit 33 is of uniform width therealong. Similar to the above-mentioned flange portion 27, the flange portion 32 is integrally formed with a projected annular portion 28a which contacts a side surface of the annular member 29 at a side opposite that contacted by the projected annular portion 27a of the flange portion 27.

Figure 5:
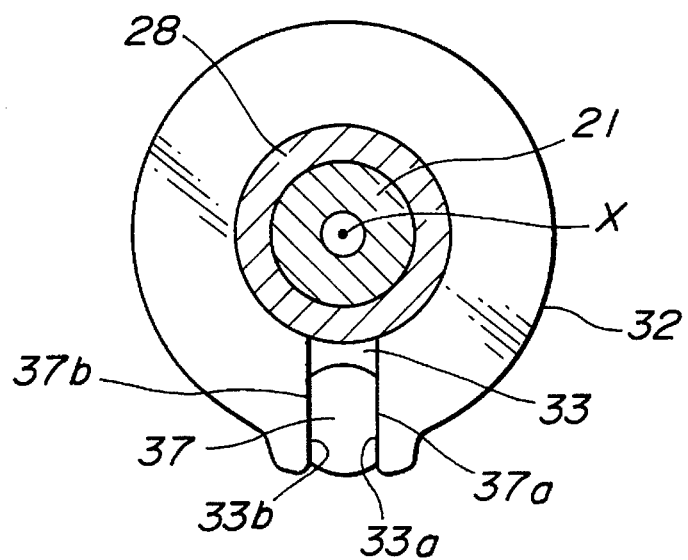
FIG. 5 is a view of engagement between the a sleeve and the annular member taken along line C—C of FIG. 3.

As may be seen in FIG. 1, 4 and 5, the elongate slit 30 of the flange portion 27 of the first shaft section 22a and the second elongate slit 33 of the second flange portion 32 of the sleeve 28 are positioned at diametrically opposed positions with respect to the axis X of the drive shaft 21.

The annular member 29 has an inner circumferential surface portion 52 representing a diameter of a central opening thereof. As is seen from FIG. 1, the annular member 29 is coaxially disposed about the drive shaft 21 with an annular space 'S' therebetween. An inner circumferential surface of a central opening 52 of the annular member 29 faces a reduced diameter portions 21b of the camshaft one across the annular space 'S'.

The annular member 29 is formed with a coaxial annular ridge 29a therearound which is rotatably received in a control ring 35 via an annular bearing 34. Further, the annular member 29 has, at diametrically opposed positions on opposing sides thereof, first and second mounting openings 29b and 29c mounting pins 36 and 37 therein to as to project in axially opposite directions. The pins 36 and 37 are slidably engaged with the above-mentioned elongate slits 30 and 33. It will be noted that the pins 36 and 37 may be rotatably mounted in the mounting openings 29b and 29c.

Referring to FIGS. 4 and 5, each of the pins 36 and 37 has opposed parallel side portions 36a, 36b and 37a, 37b which are in sliding contact with corresponding parallel side portions 30a, 30b and 33a, 33b of the slits 30 and 33.

As seen in FIG. 2, the control ring 35 has, on an outer peripheral portion thereof, a perforated projection 35a through which a supporting pin 38 passes. Thus, the control ring 35 is pivotally movable upward and downward on the axis of the supporting pin 38. At a portion of the control ring 35 diametrically opposite the projection 35a, a lever 35b is formed to extend radially outward of the control ring 35. The lever 35b is driven by a drive mechanism 39 for controlling pivotal movement of the control ring 35.

Figure 6:
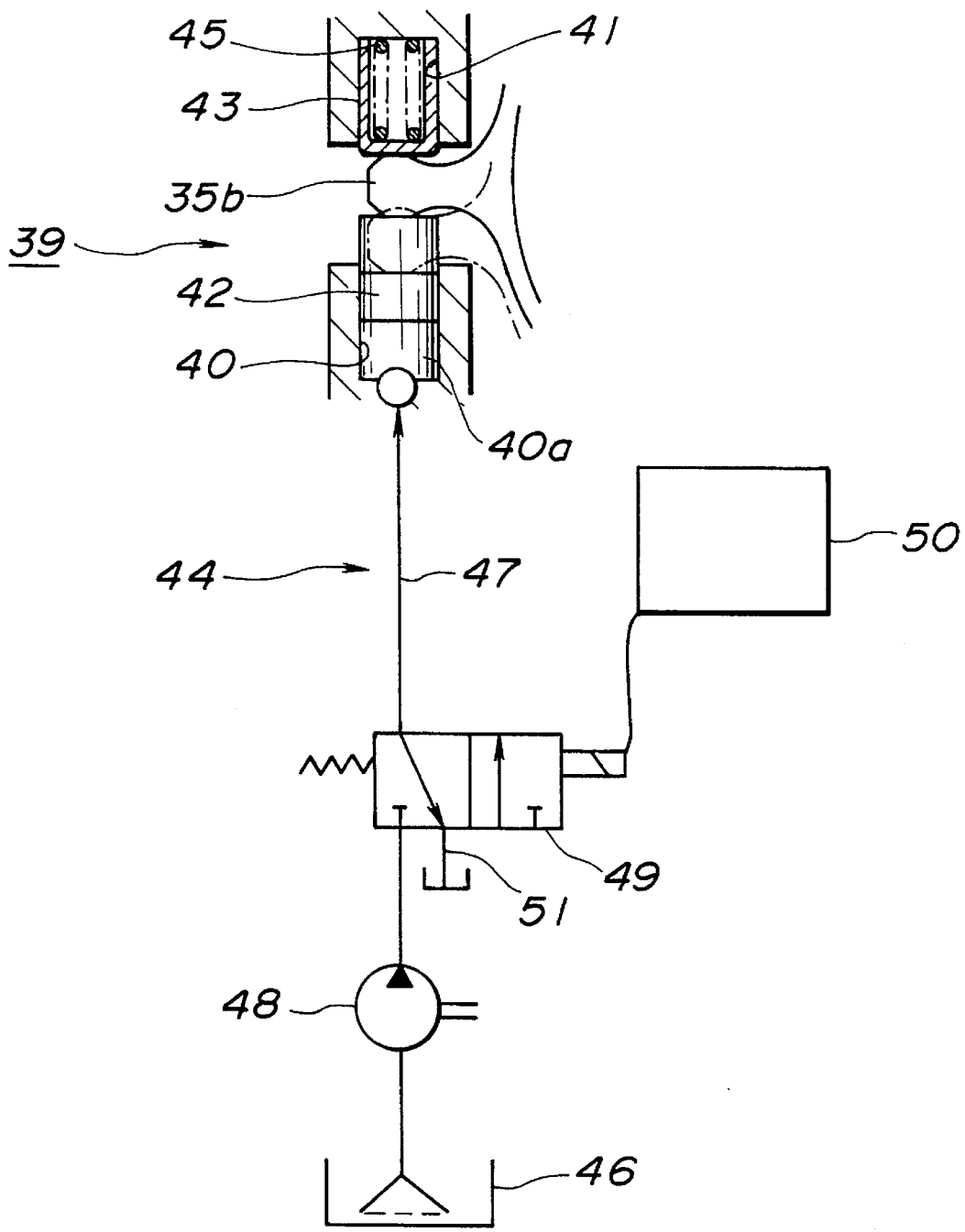
FIG. 6 is an explanatory diagram of a drive mechanism according to the invention.

As may be seen in FIGS. 2 and 6, the drive mechanism 39 comprises first and second cylinders 40 and 41 which are formed in the cylinder head to as to face each other. A piston 42 and a retainer 43 are slidably received in first and second cylinders 40 and 41 respectively, having the lever 35b fitted therebetween. As shown in the drawing, surfaces of the lever 35b contacted by the piston 42 and the retainer 43 are substantially rounded.

As shown in FIG. 6, a hydraulic member 40a defined in a first cylinder 40 is fluidly connected with a hydraulic circuit 44. That is, the piston 42 is moved in fore-and-aft direction in the first cylinder 40 in response to operation of the hydraulic circuit 44. The retainer 43 in the second cylinder 41 is a tubular member with a closed head portion. The retainer 43 is biased toward the first cylinder 40 my means of a coil spring 45 compressed in the second cylinder 41.

The hydraulic circuit 44 comprises a hydraulic passage 47 which has one end exposed to an oil pan 46 and the other end connected to the hydraulic chamber 40a of the drive mechanism 39. An oil pump 48 is disposed in the hydraulic passage 47, and an electromagnetic valve 49 is disposed in the hydraulic passage 47 downstream of the oil pump 48. As shown, the electromagnetic valve 49 is of a two-position type having three ports. The valve 49 is controlled by a controller 50. Via input data relating to, for example, engine speed, air intake amount, etc., the controller 50 may monitor operating conditions and appropriately output ON/OFF control signals to the valve 49.

Thus, when the controller issues a ON signal, the valve 49 establishes fluid communication between the oil pump 48 and the hydraulic chamber 40a, while, when the controller outputs an OFF signal, the valve 49 blocks the above fluid communication while establishing a fluid connection between the hydraulic chamber 40a and the drain passage 51.

Hereinbelow, operation of a valve control device of the above-described construction will be described in detail with reference to FIGS. 2 and 6. For case of description, a condition wherein the control ring 35 assumes its uppermost angular position as shown by a phantom line (dot-dash line) in FIG. 2, will be assumed.

First, when the controller 50 issues and ON signal to the electromagnetic valve 49, the valve 49 establishes a communication between the oil pump 48 and the hydraulic chamber 40a. Accordingly, oil is fed from the oil pump 48 to the hydraulic chamber 40a through the hydraulic passage 47. Thus, the pressure in the hydraulic chamber 40a is increased and, as is seen in the drawings, the piston 42 is moved downward against the biasing force of the coil spring 45, moving down the lever 35b of the control ring 35 and thus pivoting down the control ring 35 about the supporting pin 38.

When the control ring 35 is pivoted down to its intermediate position as shown by a solid line in FIGS. 2 and 6, a rotational center Y of the annular member 29 is aligned with the axis X of the drive shaft. Under this condition, the center of the cam shaft 22 is aligned with the center Y of the annular member 29 and there is no rotational phase difference therebetween. Consequently, in response to rotation of the drive shaft 21, the sleeve 28, which is fixed thereto via the connecting pin 31, is synchronously rotated. Also, since the cam shaft 22 is connected via the elongate slit 30 thereof to the first pin 36 of the annular member 29 and the second pin 37 of the annular member 29 engages the elongate slit 33 of the sleeve 28, the camshaft 22 is rotated synchronously with the sleeve 28. In effect, the drive shaft 21 and the cam shaft 22 rotate together about the axis X as a single unit. Further, referring to FIG. 8A, the cam profile determines opening and closing characteristics of the intake valve 23, the curved solid line K shows an L (valve lift) side and a D (valve closing) side. The D side shows faster operating characteristics than the L side due to the asymmetrical profile of the cam 26. When the valve operating angle becomes large valve closing timing may be made sufficiently slow. Thus, good fuel intake and high output torque may be obtained.

Thereafter, when, due to a change in engine operating conditions, the controller issues an OFF signal to the valve 49, the valve 49 moves so as to block communication between the oil pump 48 and the hydraulic chamber 40a and establishes a communication between the hydraulic chamber 40a and the drain passage 51. Under this condition, the oil in the hydraulic chamber 40a is reduced and thus, due to the biasing force of the valve spring 24 and the coil spring 45, the lever portion 35b of the control ring 35 is moved upward, inducing an upward pivoting of the control ring 35 to its uppermost position, as shown by a phantom line in FIGS. 2 and 6, where the rotation center Y of the annular member 29 is eccentric to the axis X of the drive shaft 21. Accordingly, each time the drive shaft 21 makes one turn, the contracting portion between the elongate slit 33 of the sleeve 28 and the pin 37 and that between the elongate slit 30 of the cam shaft 22 and the pin 36 are forced to move back and forth while continuously varying the angular speed of the annular member 29.

That is, during the time for which the drive shaft 21 makes one turn, the annular member 29 is rotated at an uneven angular speed. When the pin 37 is moved in the elongate slit 33 toward the axis X of the drive shaft, the pin 36 is moving away from the axis X in the elongate slit 30. Under this condition the annular member 29 is forced to rotate at a reduced angular speed relative to the drive shaft 21, and the cam shaft 22 is forced to rotate at a reduced angular speed relative to the annular member 29. Thus, the cam shaft 22 is rotated at half the speed of the drive shaft 21.

Figure 7:
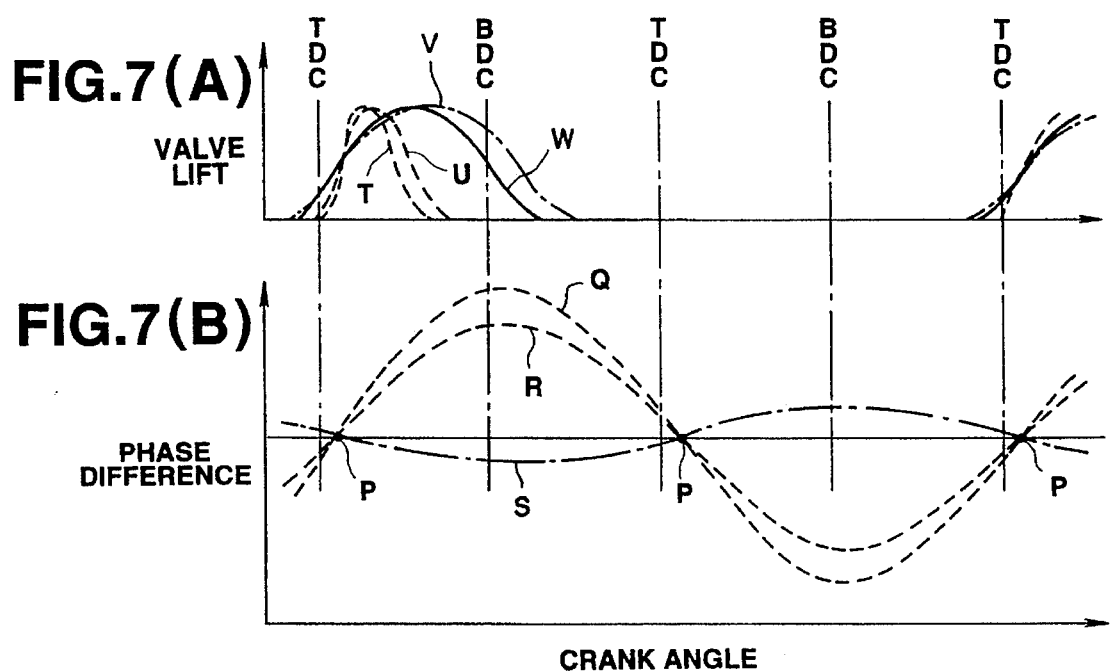
FIGS. 7A and B are graphs for explaining rotational phase variation according to the structure of the invention.

Accordingly, due to the change of angular speed, the rotational phase difference between the cam shaft 22 and the cam 26 is varied in such a manner as depicted in the graphs of FIGS. 7A and 7B. The valve timing is varied in accordance with the phase difference of the cam shaft 22 keeping the valve lift degree constant.

That is to say, when the angular speed of the cam shaft 22 is relatively high, the phase difference between the cam shaft 22 and the drive shaft 21 is advanced until they rotate at equal speed. When thereafter the angular speed of the cam shaft 22 becomes relatively small, the phase difference is delayed until they rotate at equal speed. Thus, as shown in FIG. 7B, whenever the rotational phase is being varied toward its maximum or minimum value, a phase unity point P is produced.

As seen in FIG. 7A, the broken line T shows a relatively small operating angle of the intake valve 23. While the dot-dash line S of FIG. 7B showing rotational phase variation shows that a valve opening timing is advanced to a point before the point P, and a valve closing timing is delayed until after the point P. The dot-dash V line of FIG. 7A shows a relatively large valve operating angle.

According to the present embodiment, at the small circumference portion 21b the space S is relatively large. Thus, the annular member 29 may be eccentrically displaced relative the drive shaft 21 by a relatively large degree. At this, it may be seen that a rotational phase difference corresponding to the degree of eccentric displacement allowed by the small circumference portion 21b, as shown by the dashed line Q of FIG. 7B is larger than that effected by displacement of the annular member to a degree allowed by a conventional drive shaft 21 with a uniform circumferential dimension (viz; drive shaft circumferential surface 21a), as represented by a dashed line R in FIG. 7B. Thus, according to the present embodiment, a smaller valve operating angle (dashed line T) may be obtained than the valve operating angle of a conventional arrangement (dashed line U) utilizing a drive shaft 21 of uniform circumference therealong and thus valve timing control may be favorably enhanced. The solid line W shown in the graph of FIG. 7A shows a case wherein the the rotational centers X and Y are aligned.

Furthermore, since only a single portion of the drive shaft 21 is provided with a small circumference portion 21b rather than reducing the diameter of the entire drive shaft, the bending strength of the drive shaft 21 is not significantly reduced and other aspects of valve control by the drive shaft are not affected. Further, operational characteristics for multi cylinder engine arrangements are not impaired.

In addition, referring to FIGS. 2 and 9–11, it will be noted that a point of maximum valve lift P1 and a rotational center of the base circle 26c of the cam 26 are aligned along a line Z and that the cam profile is asymmetrical at left and right sides of the center line Z. Specifically, a LIFT side of the cam 26 is defined from the cam base 26c along the LIFT side 26b to the point P1 and a DOWN side of the cam is defined from the point P1 along the DOWN side 26a to the cam base 26c. According to this construction, a cam operating angle for the LIFT side 26b of the cam may be varied from the cam operating angle for the DOWN 26a side thereof. Thus, the same valve closing characteristics as found in conventional OHC (Overhead Cam) type arrangements may be provided while the opening characteristics of the valves may be altered.

Figure 10:
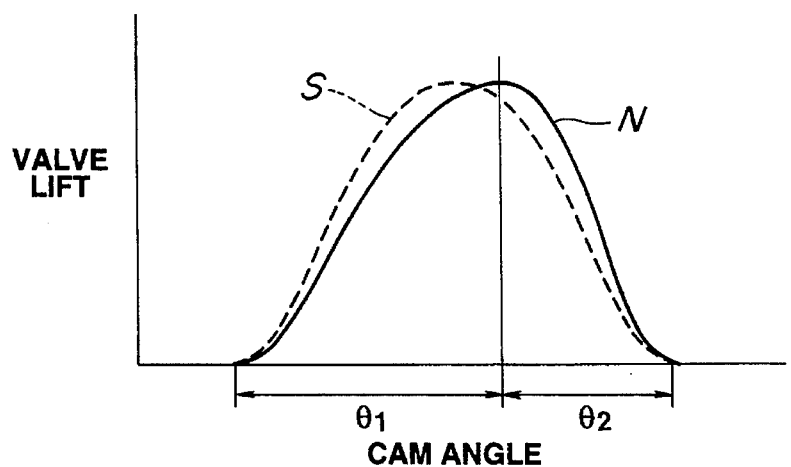
FIG. 10 is a graph comparing valve lift and cam angle of a conventional cam and an asymmetrical cam according to the invention.
Figure 11:
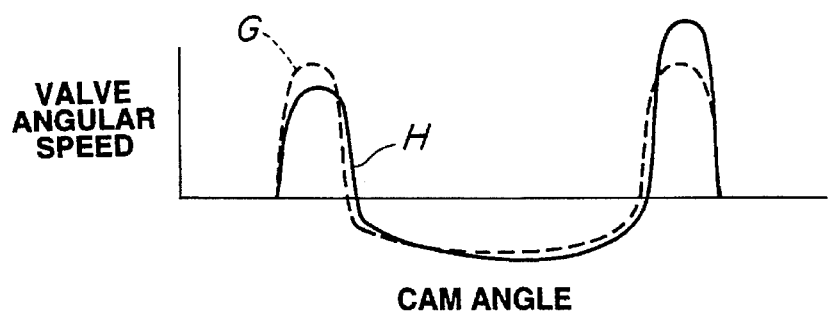
FIG. 11 is a graph comparing valve angular spped and cam angle of a conventional cam and an asymmetrical cam according to the invention.

FIG. 10 shows comparisons between a conventional, symmetrical cam (broken line S) and FIG. 11 shows a valve angular speed corresponding thereto (broken line G) while the solid lines N and H in the figures respectively show the lift and angular speed characteristics for an asymmetrical cam according to the invention. As may be seen the opening operational angle of the cam is larger than the closing angle and valve closing may be carried out at high speed. Further, according to eccentric displacement control of the annular member 29, such an asymmetrical cam may be operated to emulate the operations of a symmetrical cam.

Figure 8:
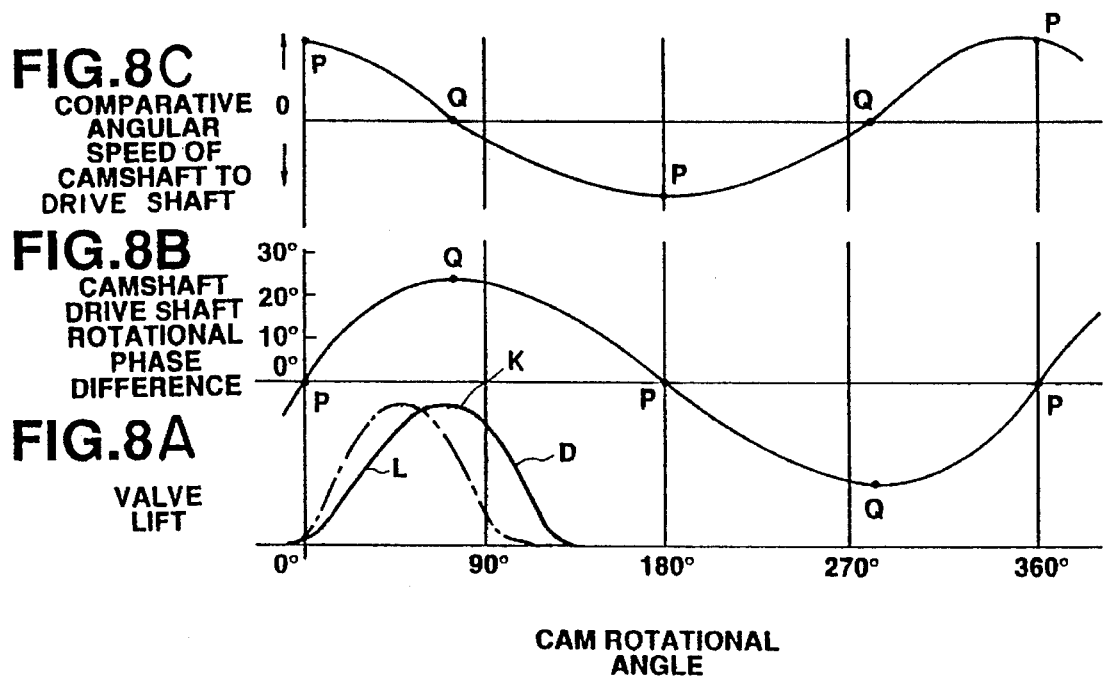
FIGS. 8 A–C are explanatory graphs for explaining features of the asymmetrical cam of the invention.

Referring to FIG. 8B, a rotational phase difference between the drive shaft 21 and the cam shaft 22 according to the above-described structure is shown. As shown by the dot-dash Y line in FIG. 8A, the operating angle during valve lift (valve timing) may be made quite small and sufficiently fast valve opening timing may be assured. Thus fuel introduction to the intake valve 23 and sufficient low torque may be favorably controlled.

Further, when the annular member 29 is pivoted eccentrically to the cam shaft 26, variation of the rotational phase difference between the drive shaft 21 and the cam shaft 22 causes increase of an angular velocity of the cam during lifting. For providing a gentler operating angle for the LIFT side 26a of the cam 26 the angular velocity may be restrained to a locus the same as that of the DOWN side 26a of the cam 26, and the characteristics of a symmetrical cam may be obtained. Referring to FIGS. 8B and 8C, in the vicinity of a point P, an angular velocity of the cam shaft 22 is large imparting high acceleration to the valve lift, causing substantially fast valve lifting. In the vicinity of a point Q, a rotational speed of the drive shaft 21 and the cam shaft 22 are substantially equal and after the point Q the rotational speed of the cam shaft 22 becomes slower than that of the drive shaft 21. At this time, when the DOWN side 26a of the cam 26 operates, if the control ring is controlled to moved move eccentrically high speed operation is discontinued as rising acceleration of the cam is prevented. Further, the DOWN side 26a can be set to an angle of a usual, symmetrical type cam wherein, even with eccentric displacement control, an angular acceleration is not varied and ordinary high speed rotation characteristics are obtained. At this, referring again to FIGS. 8B and 8C at points of speed increase, the LIFT side 26b of the cam 26 must have a gentler lift angle. According to the above structure misoperation of the valve 23 is prevented. When eccentric displacement of the control ring 29 transfers the upper rotational limit of the mechanism, or when the axis Y of the control ring and the axis X of the drive shaft are aligned to lower response characteristics, valve operation is not hindered and normal high speed rotation characteristics may be obtained in a condition wherein eccentric displacement of the control ring is not performed.

Figure 12:
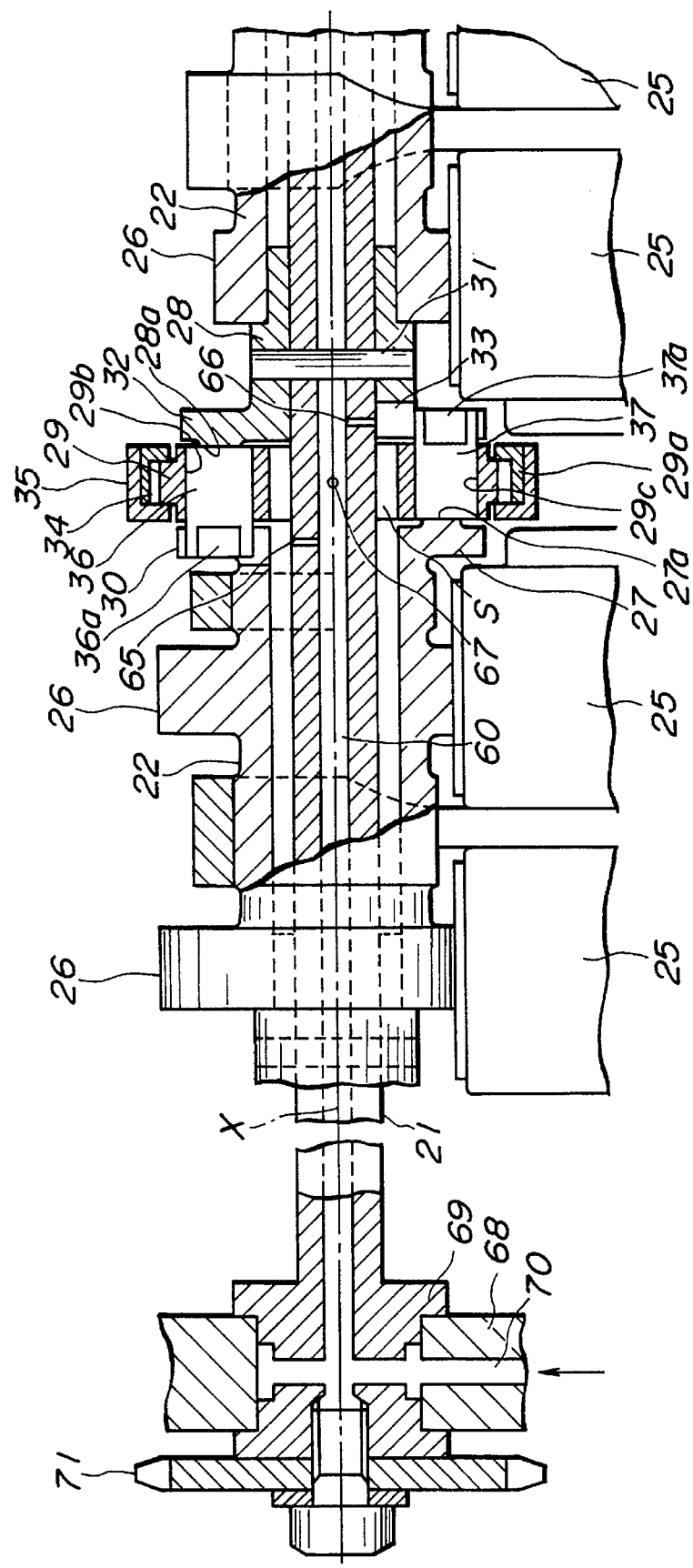
FIG. 12 is a cross-sectional view of a modification of a lubrication means of the control device according to the invention.
Figure 13:
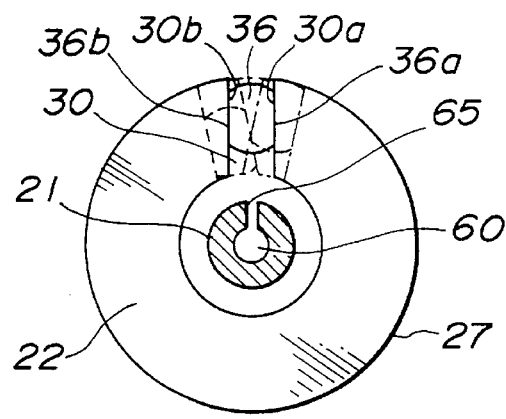
FIGS. 13, 14 and 15 are cross-sectional views of a drive shaft of the device of the invention, showing positions of lubricating passages.
Figure 14:
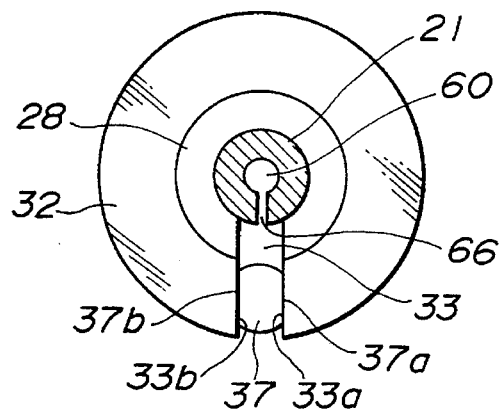
Figure 15:
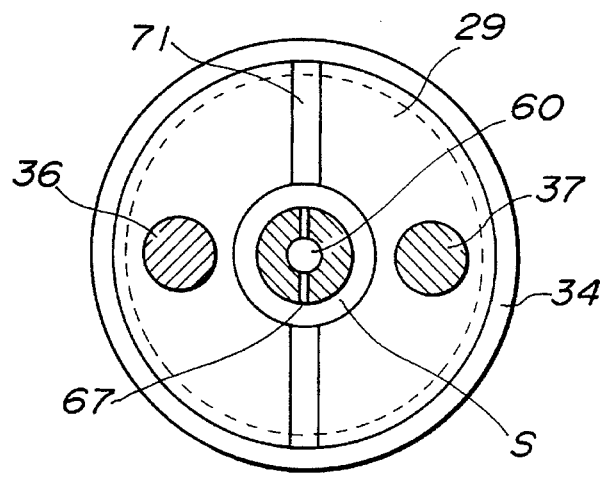

FIGS. 12–15 show a second embodiment of a lubricating arrangement according to the invention. Referring to FIG. 12 it may be seen that a narrow end of the sleeve 28 is rotatably received in an annular space between the second shaft section 22b of the cam shaft 22 and the drive shaft 21, according to this oil passages 65, 66 are provided between the oil passage 60 of the drive shaft and the flange portions 27 and 32 for continuously lubricating the pins 36, 37 and the elongate slits 30, 33 for providing smooth operating characteristics and inhibiting abrasion of the pins 36, 37 and slits 30 and 33. Furthermore, a lateral oil passage 67 is provided to lubricate contact between the drive shaft 21 and the sleeve 28, as best seen in FIG. 15.

For effecting the above, the front end of the drive shaft may be formed with a no. 1 journal 69 which is rotatably held in a support 68 having a fluid passage 70 formed therein for supplying lubricating fluid from the main oil gallery (not shown).

According to this, cost of providing lubrication is lowered since specialized lubricating component need not be added and, even at low rotational speeds, an oil pump (not shown) may supply sufficient lubrication to the mechanism.

Figure 16:
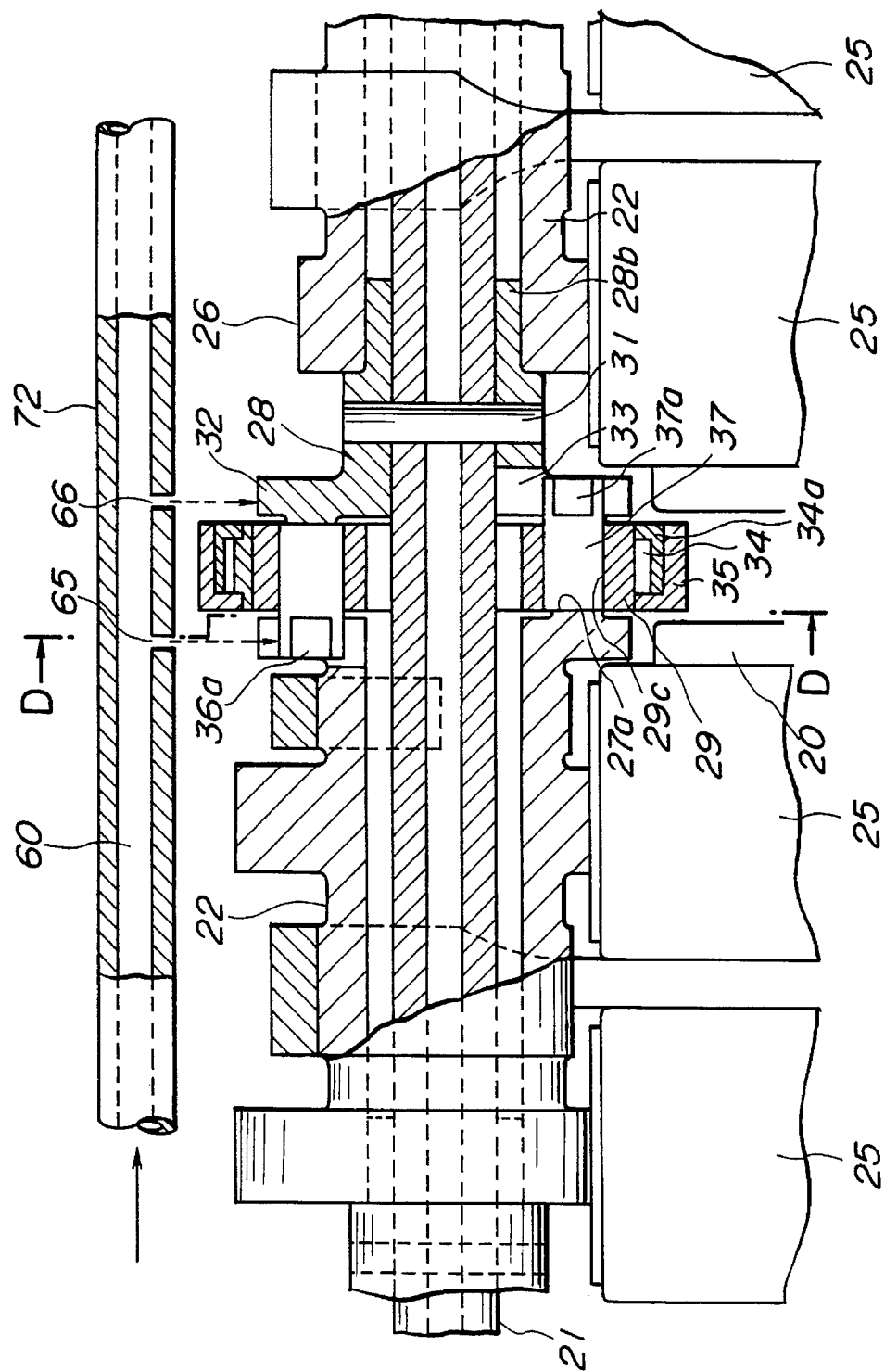
FIG. 16 is a cross-sectional view of a second modification of a lubricating means of the control device of the invention.
Figure 17:
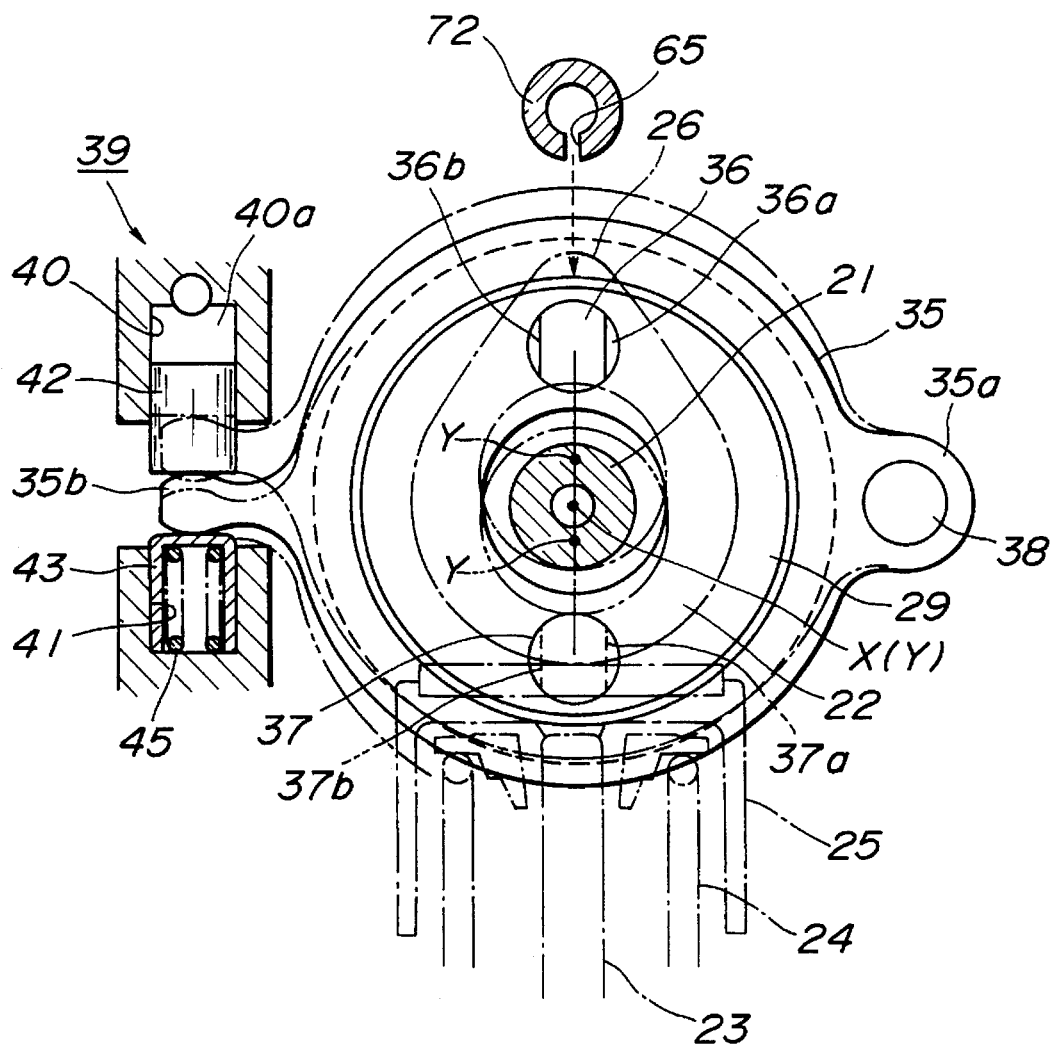
FIG. 17 is a side view of an annular member and drive means therefor showing the displacement of the lubrication means.
Figure 18:
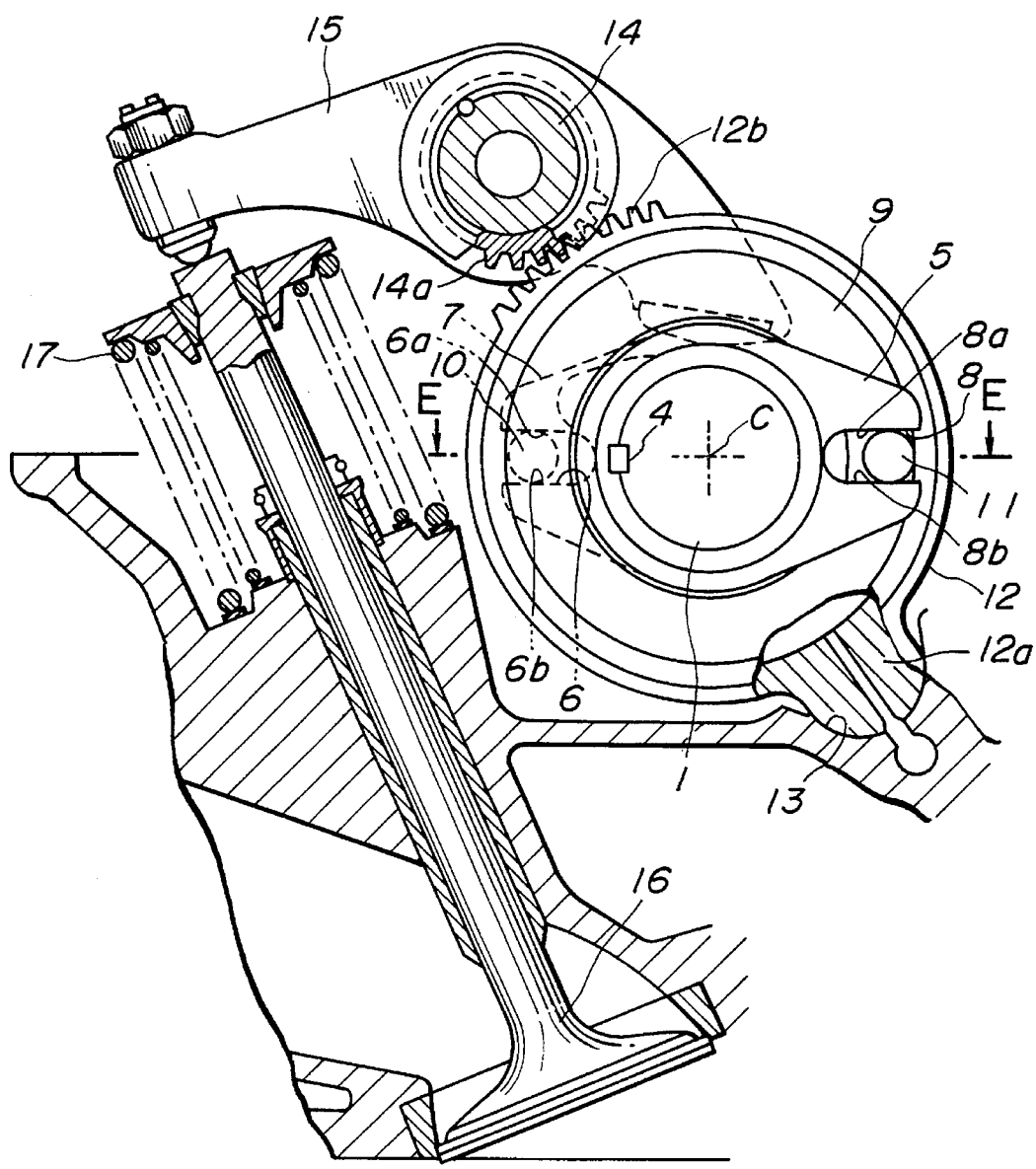
FIG. 18 is a side view of a conventional valve control device for an internal combustion engine.
Figure 19:
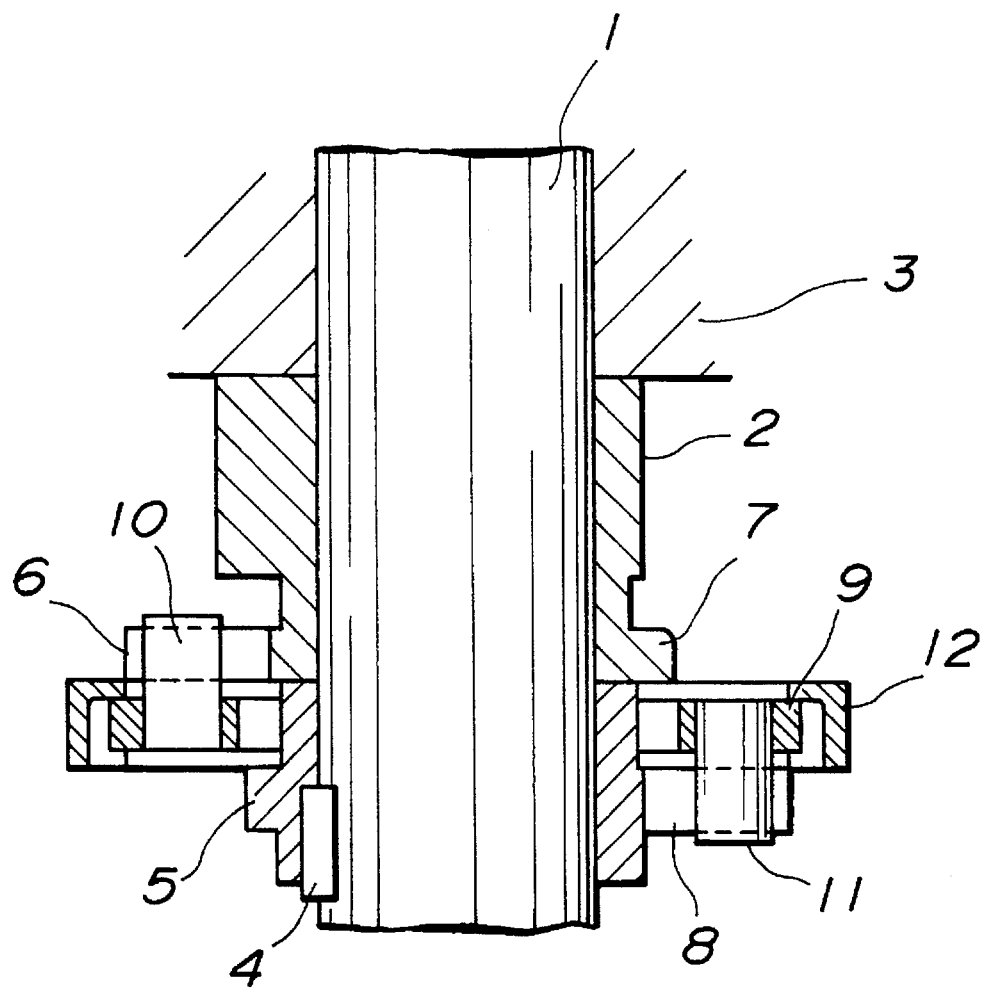
FIG. 19 is a view of an important feature of a conventional valve control device, taken along line D—D of FIG. 16.

Referring now to FIGS. 16 and 17, a third modification of a lubricating arrangement according to the invention is shown. According to this, the main oil passage 60 is not provided within the drive shaft 21 but is mounted separately, above the cam shaft 22 in as a pipe, lubricating oil passages 65, 66 are formed in the main oil passage 60 at locations above each of the flange portions 27 and 32. According to this, the oil pumped into the main oil passage 60 simply spills out over the flange portions to continuously lubricate the pins 36, 37 and the slits 30, 33. This arrangement is extremely simple to manufacture and may be implemented without retooling the components of the valve control mechanism.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. In an internal combustion engine having a drive shaft, and a plurality of cams formed about a cam shaft for operating intake and exhaust valves, a control device comprising:

a first flange provided on said cam shaft, said first flange having a first elongate slit which extends radially;

a second flange facing said first flange with a certain clearance therebetween and being secured to said drive shaft to rotate therewith, said second flange having a second elongate slit which extends radially;

an annular member rotatably disposed within said clearance, said drive shaft being disposed through a central opening of said annular member with a given clearance therebetween;

first and second pins disposed on opposed sides of said annular member respectively, said first and second pins being provided on opposing sides of said annular member and disposed at diametrically opposed positions with respect to a center of said annular member and slidably engaged with said first and second elongate slits respectively; and drive means for pivoting said annular member about a pivot axis eccentric to said axis of said drive shaft in accordance with an operating condition of said engine;

lubricating means providing lubricating fluid to a vicinity of said engagement between said first and second pins and said first and second elongate slits;

wherein said drive shaft has a reduced circumference portion formed therein at a position at which said drive shaft passes through said central opening of said annular member; and wherein a profile of a cam provided on said cam shaft is formed such that lift and closing sides of said cam are asymmetrical with respect to center line thereof.

2. A control device as set forth in claim 1, wherein said lubricating means comprises a main fluid passage formed within said drive shaft in the longitudinal direction thereof, said main fluid passage being communicated with a pressurized fluid source, and at least one lubricating passage perpendicular to said main fluid passage and communicating between said main fluid passage and an outer side of said drive shaft.

3. A control device as set forth in claim 2, wherein a plurality of said lubricating passages are provided, a first one being provided between said main fluid passage and an inner circumference of said first flange and a second being provided between said main fluid passage and said second flange.

4. A control device as set forth in claim 3, further including a lubricating passage between said main fluid passage and said clearance.

5. A control device as set forth in claim 3, further including two of said lubricating passages oriented 180° with respect to each other and axially aligned with each other and connecting between said main fluid passage and said clearance.

6. A control device as set forth in claim 1, wherein said lubricating means comprises a tube communicated with a pressurized fluid source and having a plurality of fluid outlets formed therein, said tube being mounted above said cam shaft such that said fluid outlets are positioned at least above each of said first and second flanges.

7. A control device as set forth in claim 1, wherein said cam shaft is rotatably supported within support portions rotatably receiving said cam shaft, said support portions being integrally formed with a cylinder head of said engine.

8. A control device as set forth in claim 7, wherein said cam shaft comprises a first shaft section associated with said first flange and rotatably received by said support portions, said first shaft section having an insert opening formed in an axial center thereof for receiving said drive shaft, and a second shaft section adjacent said second flange having a support formed in an end portion thereof for rotatably supporting said drive shaft, an inner circumference of said support being in sliding contact with said drive shaft.

9. A control device as set forth in claim 8, wherein said lubricating means comprises a main fluid passage formed within said drive shaft in the axial direction thereof, said main fluid passage being communicated with a pressurized fluid source, and a lubricating passage perpendicular to said main fluid passage and communicating between said main fluid passage and said inner circumference of said support.

10. A control device as set forth in claim 1, wherein said asymmetrically formed cam is shaped so as to provide a higher angular speed on a valve closing side thereof according to rotation of said cam shaft.

11. In an internal combustion engine having a drive shaft, and a plurality of cams formed about a cam shaft for operating intake and exhaust valves, a control device comprising:

a first flange provided on said cam shaft, said first flange having a first elongate slit which extends radially;

a second flange facing said first flange with a certain clearance therebetween and being secured to said drive shaft to rotate therewith, said second flange having a second elongate slit which extends radially;

an annular member rotatably disposed within said clearance, said drive shaft being disposed through a central opening of said annular member with a given clearance therebetween;

first and second pins disposed on opposed sides of said annular member respectively, said first and second pins being provided on opposing sides of said annular member and disposed at diametrically opposed positions with respect to a center of said annular member and slidably engaged with said first and second elongate slits respectively; and drive means for pivoting said annular member about a pivot axis eccentric to said axis of said drive shaft in accordance with an operating condition of said engine;

wherein said drive shaft has a reduced circumference portion formed therein at a position at which said drive shaft passes through said central opening of said annular member.

12. A control device as set forth in claim 11, wherein said cam shaft is rotatably supported within support portions rotatably receiving said cam shaft, said support portions being integrally formed with a cylinder head of said engine.

13. A control device as set forth in claim 12, wherein said cam shaft comprises a first shaft section associated with said first flange and rotatably received by said support portions, said first shaft section having an insert opening formed in an axial center thereof for receiving said drive shaft, and a second shaft section adjacent said second flange having a support formed in an end portion thereof for rotatably supporting said drive shaft, an inner circumference of said support being in sliding contact with said drive shaft.

14. A control device as set forth in claim 13, further including lubricating means comprising a main fluid passage formed within said drive shaft in the axial direction thereof, said main fluid passage communicating with a pressurized fluid source, and a lubricating passage perpendicular to said main fluid passage and communicating between said main fluid passage and said inner circumference of said support.

15. A control device as set forth in claim 14, wherein a plurality of said lubricating passages are provided, a first one being provided between said main fluid passage and an inner circumference of said first flange and a second being provided between said main fluid passage and said second flange.

16. A control device as set forth in claim 15, further including a lubricating passage between said main fluid passage and said clearance.

17. A control device as set forth in claim 15, further including two of said lubricating passages oriented 180° with respect to each other and axially aligned with each other and connecting between said main fluid passage and said clearance.

18. A control device as set forth in claim 11, further including lubricating means comprising a tube communicated with a pressurized fluid source and having a plurality of fluid outlets formed therein, said tube being mounted above said cam shaft such that said fluid outlets are positioned at least above each of said first and second flanges.

19. In an internal combustion engine having a drive shaft, and a plurality of cams formed about a cam shaft for operating intake and exhaust valves, a control device comprising:

a first flange provided on said cam shaft, said first flange having a first elongate slit which extends radially;

a second flange facing said first flange with a certain clearance therebetween and being secured to said drive shaft to rotate therewith, said second flange having a second elongate slit which extends radially;

an annular member rotatably disposed within said clearance, said drive shaft being disposed through a central opening of said annular member with a given clearance therebetween;

first and second pins disposed on opposed sides of said annular member respectively, said first and second pins being provided on opposing sides of said annular member and disposed at diametrically opposed positions with respect to a center of said annular member and slidably engaged with said first and second elongate slits respectively; and drive means for pivoting said annular member about a pivot axis eccentric to said axis of said drive shaft in accordance with an operating condition of said engine;

wherein a profile of a cam provided on said cam shaft is formed such that lift and closing sides of said cam are asymmetrical with respect to a center line thereof.

20. A control device as set forth in claim 19, wherein said asymmetrically formed cam is shaped so as to provide a higher angular speed on a valve closing side thereof according to rotation of said cam shaft.

21. A control device as set forth in claim 19, further including lubricating means comprising a main fluid passage formed within said drive shaft in the longitudinal direction thereof, said main fluid passage being communicated with a pressurized fluid source, and a lubricating passage perpendicular to said second fluid passage and communicating between said main fluid passage and an outer side of said drive shaft.

22. A control device as set forth in claim 21, wherein a plurality of said lubricating passages are provided, a first one being provided between said main fluid passage and an inner circumference of said first flange and a second being provided between said main fluid passage and said second flange.

23. A control device as set forth in claim 22, further including a lubricating passage between said main fluid passage and said clearance.

24. A control device as set forth in claim 23, further including two of said lubricating passages oriented 180° with respect to each other and axially aligned with each other and connecting between said main fluid passage and said clearance.

25. A control device as set forth in claim 19, further including lubricating means comprising a tube communicated with a pressurized fluid source and having a plurality of fluid outlets formed therein, said tube being mounted above said cam shaft such that said fluid outlets are positioned at least above each of said first and second flanges.

* * * * *